United States Patent
Morris et al.

(10) Patent No.: US 10,068,275 B2
(45) Date of Patent: Sep. 4, 2018

(54) OBTAINING REMOTE SHOPPING ADVICE

(71) Applicant: Microsoft Corporation, Redmond, WA (US)

(72) Inventors: Meredith Morris, Bellevue, WA (US); Kori Inkpen Quinn, Redmond, WA (US); Gina Danielle Venolia, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 695 days.

(21) Appl. No.: 14/155,965

(22) Filed: Jan. 15, 2014

(65) Prior Publication Data

US 2015/0106236 A1    Apr. 16, 2015

Related U.S. Application Data

(60) Provisional application No. 61/890,801, filed on Oct. 14, 2013.

(51) Int. Cl.
*G06Q 30/06* (2012.01)
*G06Q 50/00* (2012.01)

(52) U.S. Cl.
CPC ......... *G06Q 30/0629* (2013.01); *G06Q 50/01* (2013.01)

(58) Field of Classification Search
USPC ............................................. 705/26.1–27.2
See application file for complete search history.

(56) References Cited

U.S. PATENT DOCUMENTS

| | | | |
|---|---|---|---|
| 2009/0150203 A1* | 6/2009 | Baudisch | G06Q 10/103 705/301 |
| 2010/0332283 A1 | 12/2010 | Ng et al. | |
| 2011/0040662 A1* | 2/2011 | Kurtzig | G06Q 10/10 705/30 |
| 2011/0184780 A1* | 7/2011 | Alderson | G06Q 30/02 705/7.32 |

(Continued)

FOREIGN PATENT DOCUMENTS

| | | |
|---|---|---|
| WO | 2012071576 A2 | 5/2012 |
| WO | 2013095333 A1 | 6/2013 |

OTHER PUBLICATIONS

Bernstein et al., "Crowds in Two Seconds: Enabling Realtime Crowd-Powered Interfaces", In Proceedings of the 24th Annual ACM Symposium on User Interface Software and Technology, Oct. 16, 2011, 10 pages, Santa Barbara, CA, USA.

(Continued)

*Primary Examiner* — Ming Shui
(74) *Attorney, Agent, or Firm* — International IP Law Group PLLC

(57) ABSTRACT

Various methods and systems for obtaining remote shopping advice are described herein. In one example, a method includes taking two or more media representations of items to be discussed. A parameter is selected within a social shopping app for obtaining feedback on the items to be discussed. The two or more media representations are assembled into a query within the social shopping app based, at least in part, on the parameter. The query is sent to a reviewer from within the social shopping app. Feedback on the items to be discussed is received from the reviewer within the social shopping app.

20 Claims, 11 Drawing Sheets

(56) References Cited

U.S. PATENT DOCUMENTS

| | | | |
|---|---|---|---|
| 2011/0199180 A1* | 8/2011 | Holman | G08C 17/00 340/4.42 |
| 2012/0259744 A1 | 10/2012 | Ganesh et al. | |
| 2012/0265635 A1 | 10/2012 | Forsblom | |
| 2013/0030915 A1 | 1/2013 | Statler et al. | |
| 2013/0198039 A1 | 8/2013 | Sridharan et al. | |
| 2013/0211953 A1* | 8/2013 | Abraham | G06Q 30/06 705/26.8 |
| 2013/0325755 A1* | 12/2013 | Arquette | H04L 51/32 706/12 |

OTHER PUBLICATIONS

Bigham et al., "VizWiz: Nearly Real-time Answers to Visual Questions", In Proceedings of the 23nd Annual ACM Symposium on User Interface Software and Technology, Oct. 3, 2010, pp. 333-342, New York City, NY, USA.

Brady, et al., "Investigating the Appropriateness of Social Network Question Asking as a Resource for Blind Users", In Proceedings of the Conference on Computer Supported Cooperative Work, Feb. 23, 2013, pp. 1225-1236, San Antonio, TX, USA.

Burton, et al., "Crowdsourcing Subjective Fashion Advice Using VizWiz: Challenges and Opportunities", In Proceedings of the 14th International ACM SIGACCESS Conference on Computers and Accessibility, Oct. 22, 2012, pp. 135-142, Boulder, CO, USA.

Flanagan, John C., "The Critical Incident Technique", In Proceedings of Psychological Bulletin, vol. 51, Issue 4, Jul. 1954, 33 pages.

Granovetter, Mark S., "The Strength of Weak Ties", In American Journal of Sociology, vol. 78, Issue 6, May 1973, 22 pages.

Harper, et al., "Predictors of Answer Quality in Online Q&A Sites", In Proceedings of the SIGCHI Conference on Human Factors in Computing Systems, Apr. 5, 2008, pp. 865-874, Florence, Italy.

Hillman, et al., ""Shared Joy is Double Joy": The Social Practices of User Networks within Group Shopping Sites", In Proceedings of the SIGCHI Conference on Human Factors in Computing Systems, Apr. 27, 2013, 10 pages, Paris, France.

Hillman, et al., "Soft Trust and mCommerce Shopping Behaviors", In Proceedings of the 14th International Conference on Human-Computer Interaction with Mobile Devices and Service, Sep. 21, 2012, 10 pages, San Francisco, CA, USA.

Jeong, et al., "A Crowd-Powered Socially Embedded Search Engine", In Proceedings of International Conference on Weblogs and Social Media, Jul. 2013, 10 pages.

Jung, et al., "Favors from Facebook Friends: Unpacking Dimensions of Social Capital", In Proceedings of the SIGCHI Conference on Human Factors in Computing Systems, Apr. 27, 2013, 10 pages, Paris, France.

Kittur, et al., "The Future of Crowd Work", In Proceedings of the Conference on Computer Supported Cooperative Work, Feb. 23, 2013, pp. 1301-1317, San Antonio, TX, USA.

Kokkalis, et al., "Emailvalet: Managing E-Mail Overload through Private, Accountable Crowdsourcin", In Proceedings of the Conference on Computer Supported Cooperative Work, Feb. 23, 2013, pp. 1291-1300, San Antonio, USA.

Lampe, et al., "Perceptions of Facebook's Value as an Information Source", In Proceedings of the SIGCHI Conference on Human Factors in Computing Systems, May 5, 2012, 10 pages, Austin, TX.

Lasecki, et al., "Real-Time Crowd Labeling for Deployable Activity Recognition", In Proceedings of the Conference on Computer Supported Cooperative Work, Feb. 23, 2013, 10 pages, San Antonio, TX, USA.

Morris, et al., "What Do People Ask Their Social Networks, and Why? A Survey Study of Status Message Q&A Behavior", In Proceedings of the SIGCHI Conference on Human Factors in Computing Systems, Apr. 10, 2010, pp. 1739-1748, Atlanta, GA, USA.

Panovich, et al., "Tie Strength in Question & Answer on Social Network Sites", In Proceedings of Computer Supported Cooperative Work, Feb. 11, 2012, pp. 1057-1066, Seattle, WA, USA.

Pentina, et al., "The Role of Virtual Communities as Shopping Reference Groups", In Journal of Electronic Commerce Research, vol. 9, Issue 2, May 1, 2008, pp. 114-136.

Smith, Aaron, "In-store Mobile Commerce During the 2012 Holiday Shopping Season", In Proceedings of Pew Internet & American Life Project, Jan. 31, 2013, 9 pages, Washington, D.C.

Teevan, et al., "Factors Affecting Response Quantity, Quality, and Speed for Questions Asked via Social Network Status Messages", In Proceedings of the Fifth International AAAI Conference on Weblogs and Social Media , Jul. 17, 2011, pp. 630-633.

Tsujita, et al., "Complete Fashion Coordinator: A Support System for Capturing and Selecting Daily Clothes with Social Network", In Proceedings of the International Conference on Advanced Visual Interfaces, May 25, 2010, pp. 127-132, Rome, Italy.

Zhao, et al., "The Many Faces of Facebook: Experiencing Social Media as Performance, Exhibition, and Personal Archive", In Proceedings of the SIGCHI Conference on Human Factors in Computing Systems, Apr. 27, 2013, pp. 1-10, Paris, France.

* cited by examiner

900

900

1100

OBTAINING REMOTE SHOPPING ADVICE

BACKGROUND

Shopping in brick-and-mortar, i.e., non-virtual, stores is an everyday activity for many people. While shopping is sometimes done solo, it is often an activity done in pairs or small groups, which may be termed social shopping. Motivations for social shopping range from task-related reasons, such as getting assistance with decision-making, to relationship reasons, such as companionship and reinforcing social bonds. Mobile phones, especially smartphones, make it possible to get some of the benefit of social shopping at a distance. The increasing capabilities of mobile phones and of social platforms further the possibilities for remote collaboration while shopping, an activity referred to herein as seeking remote shopping advice. A recent survey suggests that using mobile phones to seek remote shopping advice is an emerging trend. Around 38% of U.S. shoppers with cell phones made phone calls seeking shopping advice during the 2011 Christmas holiday shopping season, rising to 46% during the 2012 holiday season. However, current communication tools do not provide specific support for the experience.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a method for obtaining remote shopping advice. The method includes taking two or more media representations of items to be discussed. A parameter is selected within a social shopping app for obtaining feedback on the items to be discussed. The two or more media representations are assembled into a query within the social shopping app based, at least in part, on the parameter. The query is sent to a reviewer from within the social shopping app. Feedback is received from the reviewer on the items to be discussed within the social shopping app.

Another embodiment provides one or more computer-readable storage media for obtaining feedback comprising a plurality of instructions that when executed by a processor, cause the processor to assemble two or more media representations into a single view. When executed by a processor the instructions also cause the processor to present a parameter for a reviewer for selection by a shopper, and assemble the single view into a query based, at least in part, on the parameter. The instructions direct the processor to send the query to the reviewer receive feedback from the reviewer, and present the feedback to the shopper.

Another embodiment provides a system for obtaining remote shopping advice. The system includes a processor to execute processor executable code, a communications device, a display device, and a storage device that stores processor executable code. The processor executable code, when executed by the processor, causes the processor to assemble two or more media representations into a single view on the display device, present a parameter for selecting a reviewer on the display device, and assemble the single view into a query based, at least in part, on the parameter. The processor executable when executed by the processor, causes the processor to send the query to the reviewer over the communications device, receive feedback from the reviewer, and present the feedback to the shopper on the display device.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Consumers shopping in "brick-and-mortar" (non-virtual) stores often use their mobile phones to consult with others about potential purchases. Embodiments described herein provide a method and system for obtaining remote shopping advice. To determine the functionality that would make the techniques useful to shoppers, a survey (n=200) was performed to detail current practices in seeking remote shopping advice. The ability of current and futures tools to assist in the experience, such as social networking sites and crowd labor markets, was considered. As discussed in the example provided herein, a field experiment in which shoppers shared photographs of potential purchases via MMS, Facebook, and Mechanical Turk. Paid crowdsourcing, in particular, proved useful data for techniques to augment an in-store shopping experience.

Figure 1:
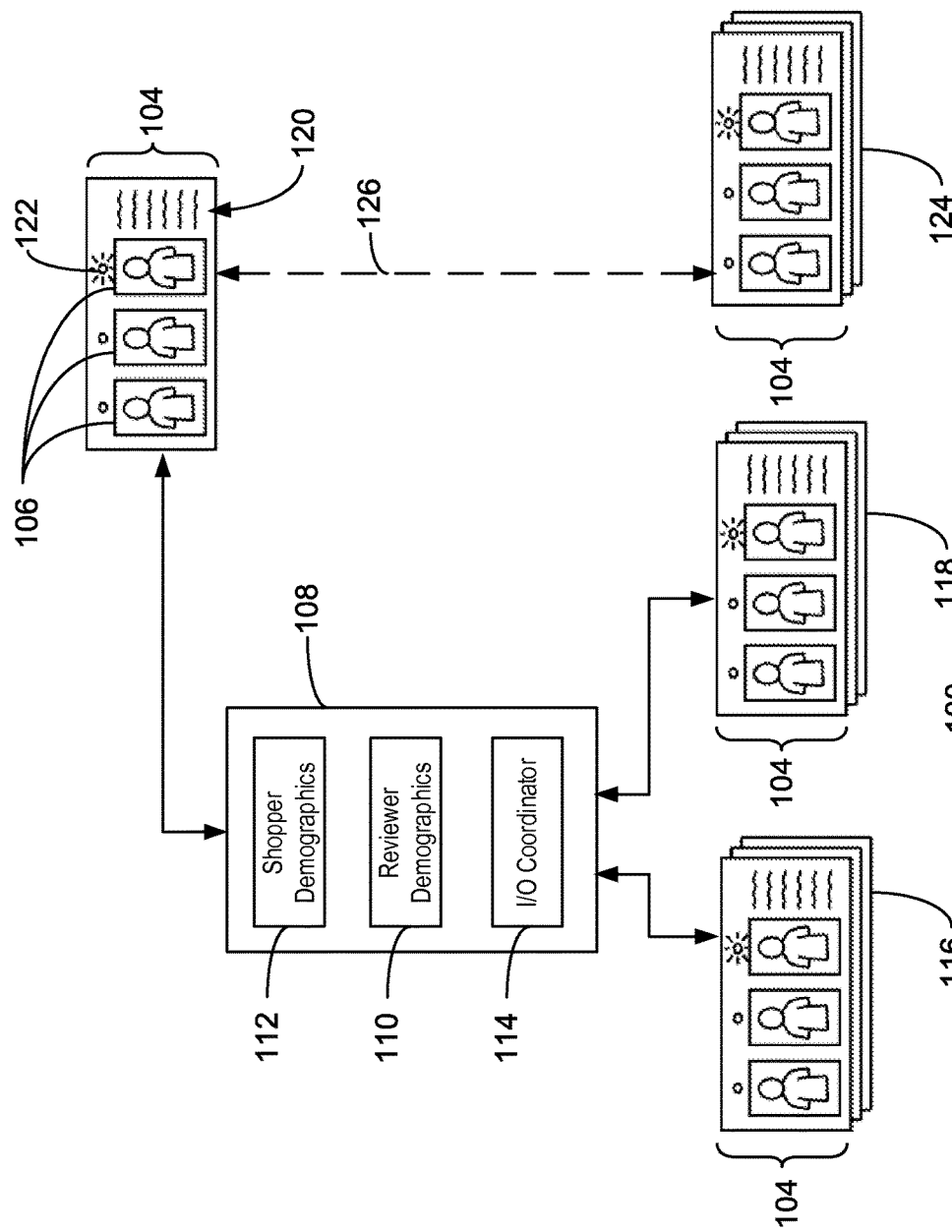
FIG. 1 is a block diagram of an example of a computing system that can be used for obtaining remote shopping advice.
Figure 2:
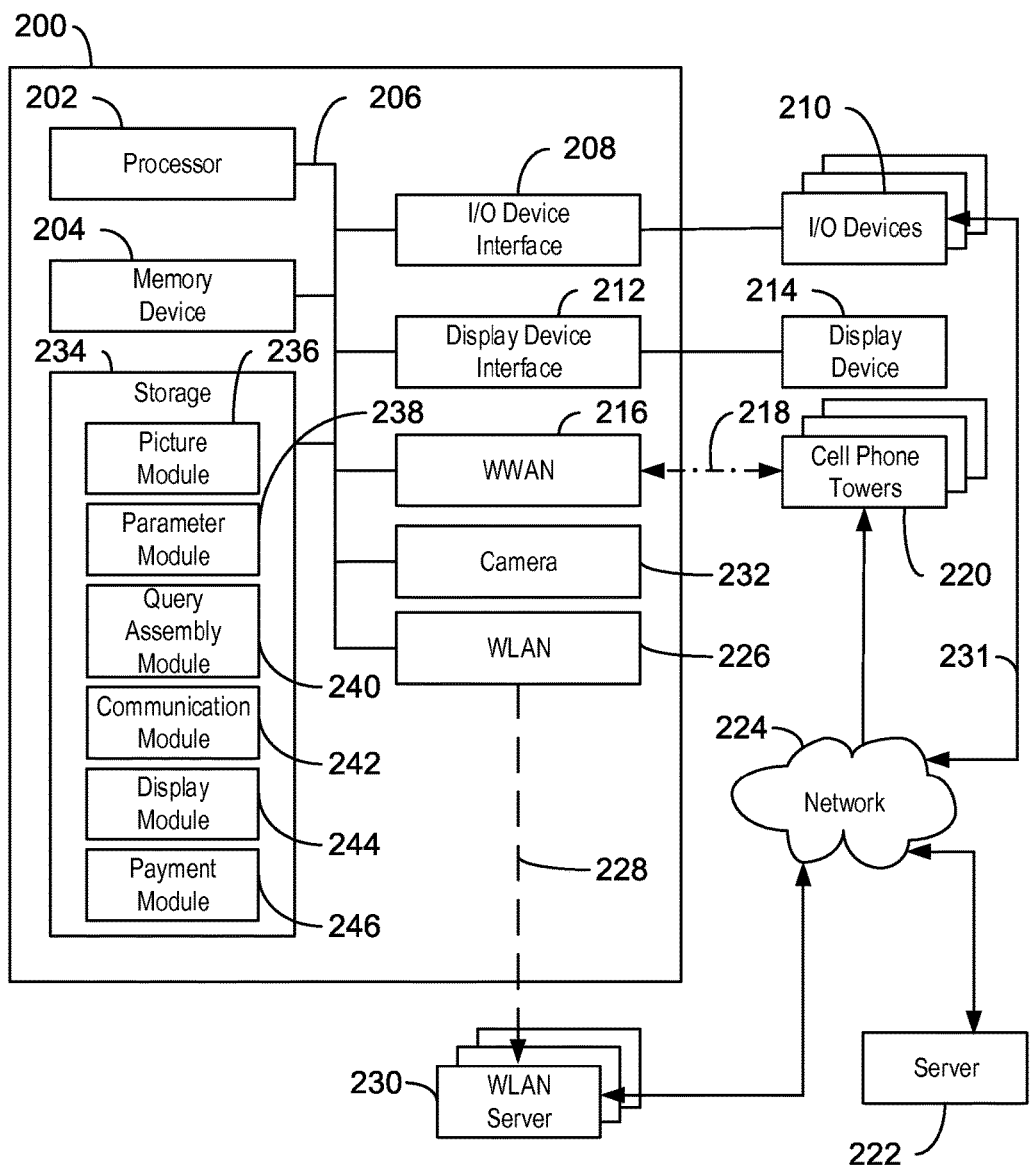
FIG. 2 is a block diagram of an example of a computing device that can be used for obtaining remote shopping advice.
Figure 3:
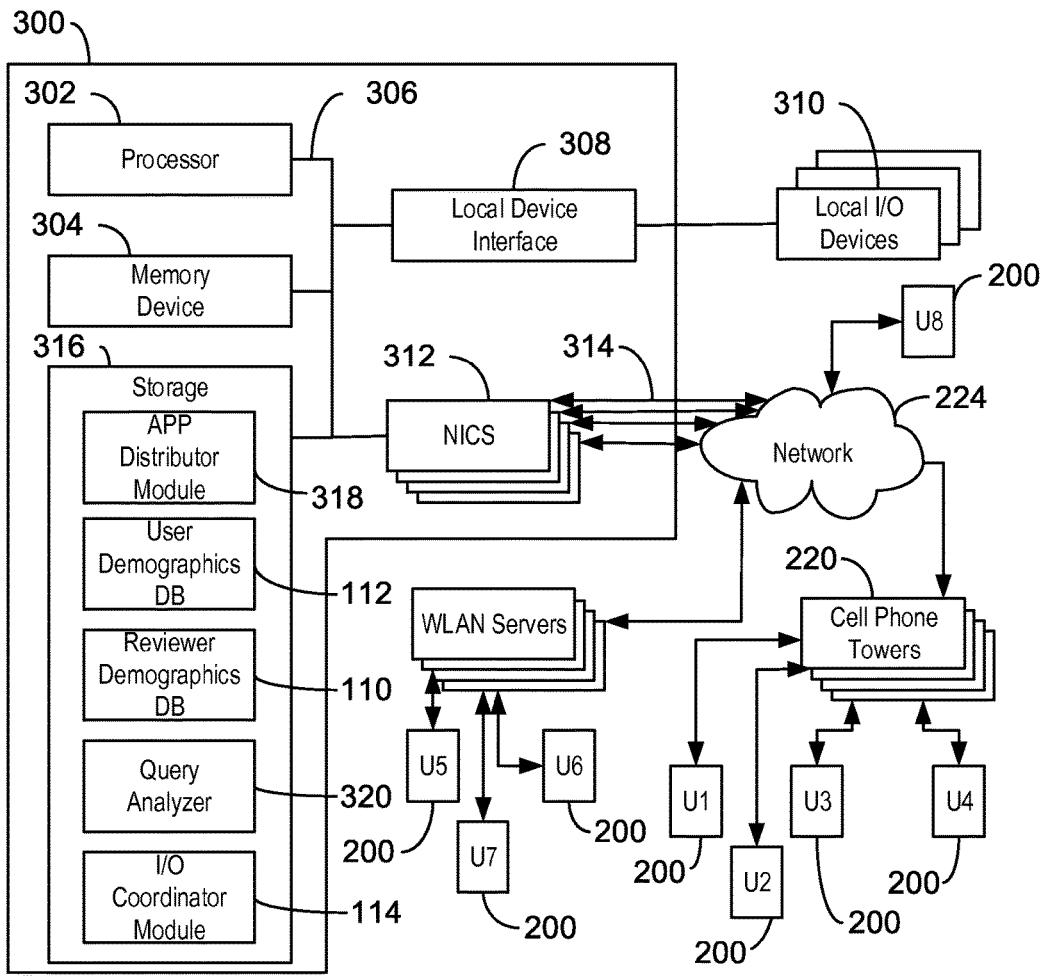
FIG. 3 is a block diagram of an example of a server system that can be used for obtaining remote shopping advice.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIGS. 1-3, discussed below, provide details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As for terminology, the term "app" includes any kind of software specifically written to perform a function, generally on a mobile computing device, such as a mobile phone or tablet. However, as used herein, app may also refer to software downloaded to a laptop or desktop computer to perform a similar function as on the mobile computing device.

The phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system 100 that can be used for obtaining remote shopping advice. In this embodiment, an application or "App" on a mobile device 102 can be used to assemble a query 104 that includes two or more pictures 106 of items for which a shopper would like to obtain feedback. The items may include any items the shopper would like to compare, such as items of clothing, jewelry, or shoes, among others. The app can allow the shopper to select parameters for reviewers, such as age range, gender, cost of feedback, expertise, and the like. The techniques described herein are not limited to pictures, but may include any media representations, such as pictures, video clips, sound clips, or any combinations thereof. The media representations can be assembled onto a single screen or view, wherein clicking on links within the view can play time dependent media files, such as video and sound files.

The app may be used to send the query 104 to a server 108, which can compare the parameters to a reviewer demographics database 110 to identify reviewers. The reviewer demographics database 110 may list reviewers by age, gender, body type, cost of feedback, expertise, and the like. A shopper demographics database 112 may have previously entered information on the shopper, such as age, gender, payment information, lists of friends, membership status, and the like, which can be used by the server 108 in concert with the reviewer demographics database 110 to automatically identify reviewers. The server 108 can also have an input/output coordinator module 114 to send the query 104 to reviewer's devices, such as devices 116 belonging to shopping experts or to devices 118 owned by persons having a demographic match, among others. The server 108 may also coordinate feedback from friends using the lists in the shopper's profile in the shopper demographics database 112.

Once the reviewers have replied to the query with their feedback, the server 108 can assemble the feedback and either incrementally send it on to the mobile device 102 or send it as a single message. The feedback may take the form of comments 120 displayed proximate to the pictures 106. The feedback may also be in a simpler form, such as an indicator 122 displayed proximate to the picture indicated as most preferable by the largest number of reviewers. In some embodiments, the feedback may be recorded messages, or two way communications established between a reviewer and a shopper. Further, the feedback may be displayed on a separate screen from the pictures.

The app does not have to send the query 104 through the server 108. In some embodiments, the mobile device 102 can send the query 104 directly to devices 124 belonging to reviewers on a previously selected list, for example, through a cell phone network 126. In this case, the devices 124 may be used to directly provide feedback to the mobile device 102 of the shopper.

It is to be understood that the block diagram of FIG. 1 is not intended to indicate that the computing system 100 is to include all of the components shown in FIG. 1. Rather, the computing system 100 can include fewer or additional components not illustrated in FIG. 1, such as additional mobile devices, non-mobile devices, and the like.

FIG. 2 is a block diagram of an example of a computing device 200 that can be used for obtaining remote shopping advice. The computing system 200 may be a portable device, such as a mobile phone, a tablet computer, or a laptop computer, among others. In some embodiments, the computing system 200 may be a desktop computer, for example, used by a reviewer to provide feedback. The computing system 200 may include a processor 202 that is adapted to execute stored instructions, as well as a memory device 204 that stores instructions that are executable by the processor 202. The processor 202 can be a single core processor, a multi-core processor, a computing cluster, or any number of other configurations. The memory device 204 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 202 may be used to obtain remote shopping advice.

The processor 202 may be connected through a system bus 206 (e.g., a proprietary bus, PCI, ISA, PCI-Express, HyperTransport®, NuBus, etc.) to an input/output (I/O) device interface 208 adapted to connect the computing system 200 to one or more I/O devices 210. The I/O devices 210 may include, for example, a camera, a gesture recognition input device, a keyboard, a pointing device, a voice recognition device, and a network interface, among others. The pointing device may include a touchpad or a touchscreen, among others. The I/O devices 210 may be built-in components of the computing system 200, or may be devices that are externally connected to the computing system 200.

The processor 202 may also be linked through the system bus 206 to a display device interface 212 adapted to connect the computing system 200 to a display device 214. The display device 214 may include a display screen that is a built-in component of the computing system 200. The display device 214 may also include a computer monitor, television, or projector, among others, that is externally connected to the computing system 200.

Other devices can be included to facilitate mobile communications. For example, a wireless wide area network (WWAN) radio 216 may be coupled to the processor 202 through the bus 206, providing a communications link 218 to one or more cell phone towers 220. Through the cell phone towers 220, the computing system 200 may be linked to a server 222, for example, through the Internet 224. The server 222 may be as described with respect to server 108 of FIG. 1.

Other interfaces may also be used. For example, a wireless local area network (WLAN) radio 226 may be used to provide a wireless link 228 to one or more wireless servers 230, such as an in-store network. The wireless servers 230 can then place the computing system 200 in communications with the server 222. The computing system 200 is not limited to wireless devices. One of the I/O devices 210 may be a network interface card that provides a communications link 231 to the Internet 224, allowing communications with the server 222.

A camera 232 can be coupled to the processor 202 through the bus 206, allowing the computing device 200 to take pictures. The pictures can be used in a query for remote shopping advice, as described herein.

Storage 234 can be coupled to the processor 202 through the bus 206. The storage 234 can include a hard drive, an optical drive, a USB flash drive, an array of drives, or any combinations thereof. The storage 234 can include a number of modules configured to implement obtaining remote shopping advice, as described herein. For example, the storage 234 can include a picture module 236, a parameter module 238, a query assembly module 240, a communication module 242, a display module 244, and a payment module 246, among others. The picture module 236 may be used to take pictures using the camera 232, for example, of two or more items to be discussed. In some embodiments, the picture module 236 may not be needed, as one or more of the pictures may already be stored on the computing device 200. The parameter module 238 can present choices to the shopper that will be used to select the reviewers, such as demographic descriptions, cost limits, or predefined lists, among others. The query assembly module 240 can be used to assemble the query, for example, allowing the shopper to assemble the images of the items into a side-by-side view and enter a textual query to go with the pictures. The query assembly module 240 can then assemble the pictures and the parameters into a single message that can be sent out by the communications module 242. The communications module 242 can send the query to a server to be sent on to one or more reviewers, or may be used to directly send the query on to other devices, such as mobile phones owned by friends.

Once feedback is returned, the display module 244 can be used to present the feedback to the shopper. For example, comments can be displayed in a streaming window proximate to the pictures or colors can be changed on the display to indicate favorable choices. If the shopper indicated that paying for feedback was acceptable, a payment module 246 may be used to provide payment information to a server.

It is to be understood that the block diagram of FIG. 2 is not intended to indicate that the computing system 200 is to include all of the components shown in FIG. 2. Rather, the computing system 200 can include fewer or additional components not illustrated in FIG. 2, e.g., additional applications, additional modules, additional memory devices, additional network interfaces, and the like. Furthermore, any of the functionalities of the picture module 236, the parameter module 238, the query assembly module 240, the communication module 242, the display module 244, or the payment module 246 may be partially, or entirely, implemented in hardware and/or in the processor 202. For example, the functionality may be implemented with an application specific integrated circuit, in logic implemented in the processor 202, or in any other device. Further, the computing system 200 is not limited to the modules shown as any combinations of the code used to implement these functions can be implemented.

FIG. 3 is a block diagram of an example of a server system 300 that can be used for obtaining remote shopping advice. Like numbered items are as described with respect to FIGS. 1 and 2. Further, the server system 300 can function as the server 108 described with respect to FIG. 1. The server system 300 may be a single server installation, or may be part of a cloud server service, for example, a virtual server. The server system 300 may include a processor 302 that is adapted to execute stored instructions, as well as a memory device 304 that stores instructions that are executable by the processor 302. The processor 302 can be a single core processor, a multi-core processor, a computing cluster, or any number of other configurations, and may also include virtual processors that are configured in a cloud environment. The memory device 304 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems, such as virtual memory in a cloud environment. The instructions that are executed by the processor 302 may be used to obtain remote shopping advice.

The processor 302 may be connected through a system bus 306, which may include a proprietary bus, PCI, ISA, PCI-Express, HyperTransport®, NuBus, and the like, to a local device interface 308 adapted to connect the computing system 300 to one or more local I/O devices 310. The local I/O devices 310 may include, for example, a keyboard, a pointing device, and a display, among others. The pointing device may include a touchpad or a touchscreen, among others. The system bus 306 does not have to be a physical bus, but may be simulated in a cloud computing environment.

Other devices can be included to facilitate communications for the server. For example, one or more network interface cards 312 can be coupled to the processor 302 through the bus 306, providing one or more communications links 314 to the Internet 224. The Internet 224 can be used to place the server system 300 in communication with cell phone towers 220. Through the cell phone towers 220, the server system 300 may be linked to computing devices 200, such as U1-U4. Further, the Internet 224 can be used to link the server system 300 to other computing devices 200, such as U5-U7, through WLAN servers 230. A noted herein, the WLAN servers 230 can be located at retail stores to facilitate communications and shopping for customers. Further, retail shops may choose to provide computing devices, such as tablets, to shoppers to facilitate the service. Desktop computers may also be linked to the server system 300 through the Internet 224, as shown for computing device 200 U8.

Storage 316 can be coupled to the processor 302 through the bus 306. The storage 316 can include a hard drive, a solid state drive, an optical drive, a USB flash drive, an array of drives, virtual drives in a cloud computing environment, or any combinations thereof. The storage 316 can include a number of modules configured to implement a server functionality for obtaining remote shopping advice, as described herein. For example, the storage 316 can include an app distributor module 318, a shopper demographics database 112, a reviewer demographics database 110, a query analyzer 320, and an input/output coordinator module 114, among others. The app distributor module 318 can be used to register shoppers and reviewers and provide apps for downloading to mobile devices, as well as software to operate on desktop computers. The app distributor module 318 can also be used to build the demographics databases. The query analyzer 320 can be used to parse queries to identify the shopper and the reviewers, based, at least in part, on the parameters selected. The query analyzer 320 can also be configured to perform other functions, such as filtering requests and feedback to eliminate messages that are in violation of terms-of-service agreements, such as requests containing profane language. In an embodiment, the shopper may also set a parameter in the query that requests that messages containing certain terminology be eliminated. For example, if a shopper is obtaining feedback from unknown reviewers, the shopper may choose to have the query analyzer 320 filter out feedback with terms such as fat, obese, and the like. This may make the shopping experience more pleasant for the shopper. The query analyzer 320 can select the reviewers, for example, on selections of demographic descriptions, cost limits, or predefined lists, among others. In addition to these functions, the query analyzer 320 may charge the shopper for the costs of the query.

It is to be understood that the block diagram of FIG. 3 is not intended to indicate that the computing system 300 is to include all of the components shown in FIG. 3. Rather, the computing system 100 can include fewer or additional components not illustrated in FIG. 3, e.g., additional applications, additional modules, additional memory devices, additional network interfaces, and the like. Furthermore, any of the functionalities of the app distributor module 318, the shopper demographics database 112, the reviewer demographics database 112, the query analyzer 320, and the input/output coordinator module 114, among others, may be partially, or entirely, implemented in hardware and/or in the processor 302. For example, the functionality may be implemented with an application specific integrated circuit, in logic implemented in the processor 302, or in any other device. Further, the computing system 300 is not limited to the modules shown as any combinations of the code used to implement these functions can be made.

Figure 4:
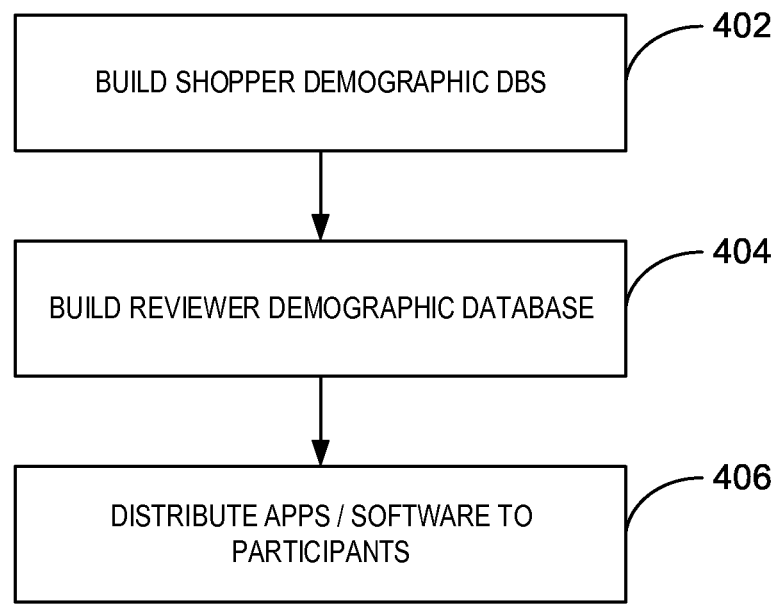
FIG. 4 is a process flow diagram of an example method for configuring a social shopping environment.

FIG. 4 is a process flow diagram of an example method 400 for configuring a social shopping environment. The method 400 may be implemented on the server system 300 discussed with respect to FIG. 3. The method 400 starts at block 402 with building the shopper demographic database. This may be done using commercial databases, a registration drive to sign up shoppers and reviewers, or incrementally, for example, as a new shopper or reviewer registers. At block 404 the reviewer demographic database is built. This may be performed by advertising for reviewers, using a crowd source server, like the Mechanical Turk system from Amazon™. The reviewer database may also be built or update incrementally, for example, by asking shoppers if they also want to be reviewers. If so, their information would then be shared between the databases. The shoppers may be rewarded for participating as reviewers by getting credits for the reviews they perform that can be used to request reviews. At block 406, the apps or software is provided to the shoppers or reviewers for downloading.

The process flow diagram of FIG. 4 is not intended to indicate that the steps of the method 400 are to be executed in any particular order, or that all of the steps of the method 400 are to be included in every case. Further, any number of additional steps may be included within the method 400, depending on the specific application.

Figure 5:
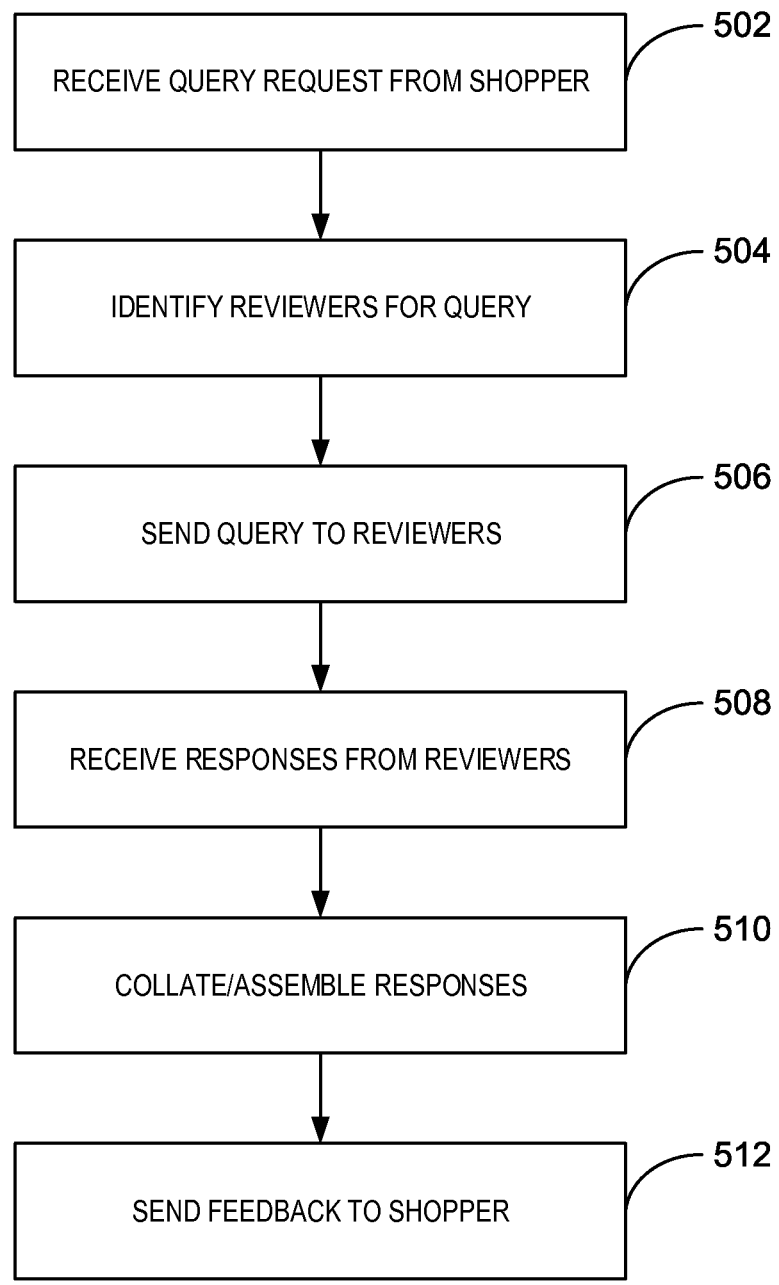
FIG. 5 is a process flow diagram of an example method for implementing a social shopping environment on a server system.

FIG. 5 is a process flow diagram of an example method 500 for implementing a social shopping environment on a server system. The method 500 may be implemented on the server system 300 discussed with respect to FIG. 3. The method 500 starts at block 502 when a query request is received from a shopper. At block 504, the query is analyzed to identify reviewers for the query. As discussed herein, this may be on the basis of demographic selections may by the shopper, cost decisions made by the shopper, lists of reviewers provided by the shopper, or on other parameters, or any combinations thereof. At block 506, the query can be sent to the reviewers identified for their feedback on the items. At block 508, responses are received from the reviewers. The responses can be messages discussing the items, a vote as to which item is most preferable, or some combinations thereof. At block 510, the responses may be collated and assembled into a single message, for example, identifying which item was preferred by the majority of reviewers. Further, any messages not fitting the terms-of-service or the filters set by the shopper may be removed. At block 512, the feedback can be sent on to the shopper, either incrementally, or in a single message.

The process flow diagram of FIG. 5 is not intended to indicate that the steps of the method 500 are to be executed in any particular order, or that all of the steps of the method 500 are to be included in every case. Further, any number of additional steps may be included within the method 500, depending on the specific application.

Figure 6:
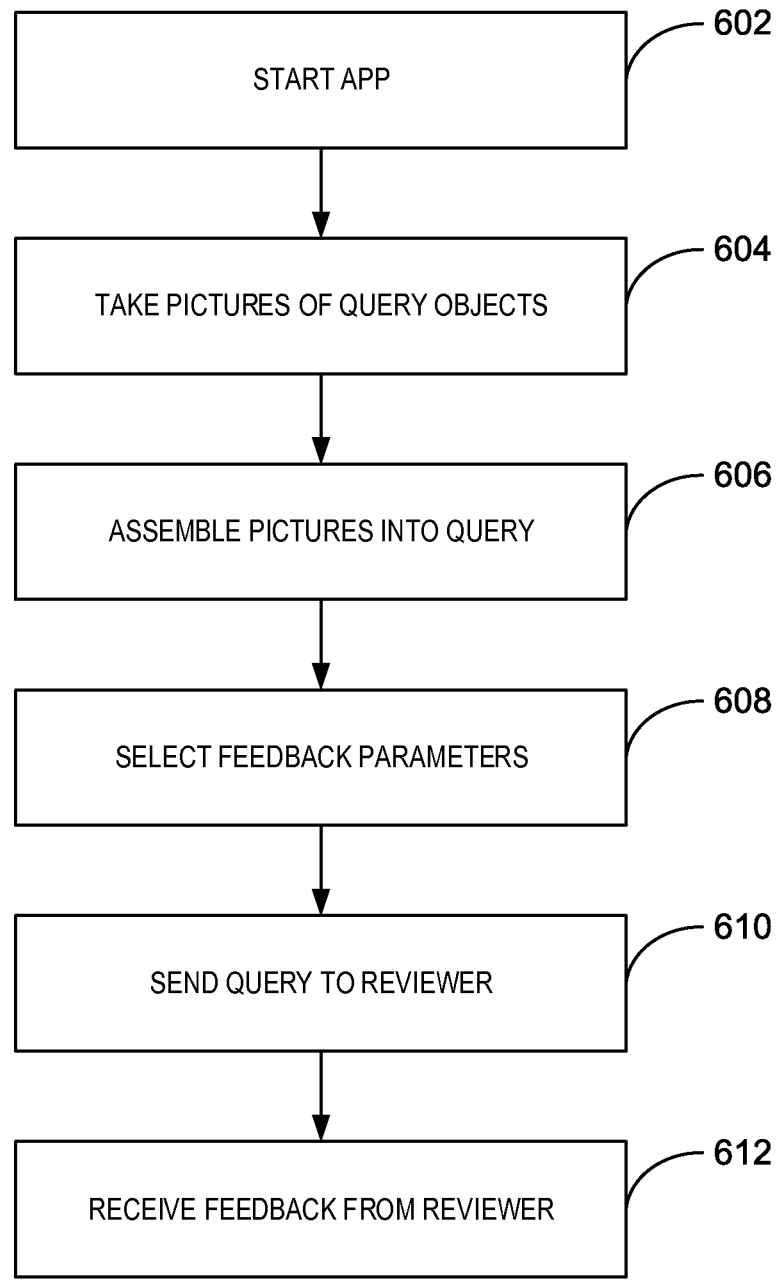
FIG. 6 is a process flow diagram of an example of implementing a social shopping environment on a computing device.

FIG. 6 is a process flow diagram of an example of a method 600 for implementing a social shopping environment on a computing device. The method may be implemented by the computing device 200 described with respect to FIG. 2. The method 600 begins at block 602 when a software app is started on a computing device. At block 604, the app can be used to take pictures of the two or more items for which the shopper would like to receive feedback. At block 606, the shopper can use the app to assemble the pictures into a single comparative shot. The pictures do not have to be taken by the app, but may be previously taken pictures accessed from a storage device. This may be useful, for example, when a shopper is comparing items from multiple stores or at different times. The app may also include a function to store pictures to be used at a later time for this comparison.

At block 608, the shopper selects feedback parameters for the query. As described herein, these parameters may include demographic groups, such as gender or age, and costs, among others, for the reviewers. In addition, the shopper can indicate whether they want to use previously defined lists of friends and how much they are willing to pay for the review. The feedback parameters can include any number of other selections, such as filters to eliminate messages containing words or other content that the shopper does not wish to receive.

At block 610, the query can be sent to reviewers, for example, by first being sent on to a server system, then being forwarded onto to reviewers that meet the selected criteria. In some embodiments, the shopper's computing device can send the query directly to other computing devices, without being forwarded from a server system. In this case, a list of reviewers might be stored on the computing device.

At block 612, the feedback is received back from the reviewers, for example, being forwarded from the server system. The feedback can then be displayed by the computing device to indicate which items were most preferred by the reviewers and comments made by the reviewers, among others.

The process flow diagram of FIG. 6 is not intended to indicate that the steps of the method 600 are to be executed in any particular order, or that all of the steps of the method 600 are to be included in every case. Further, any number of additional steps may be included within the method 600, depending on the specific application.

Figure 7:
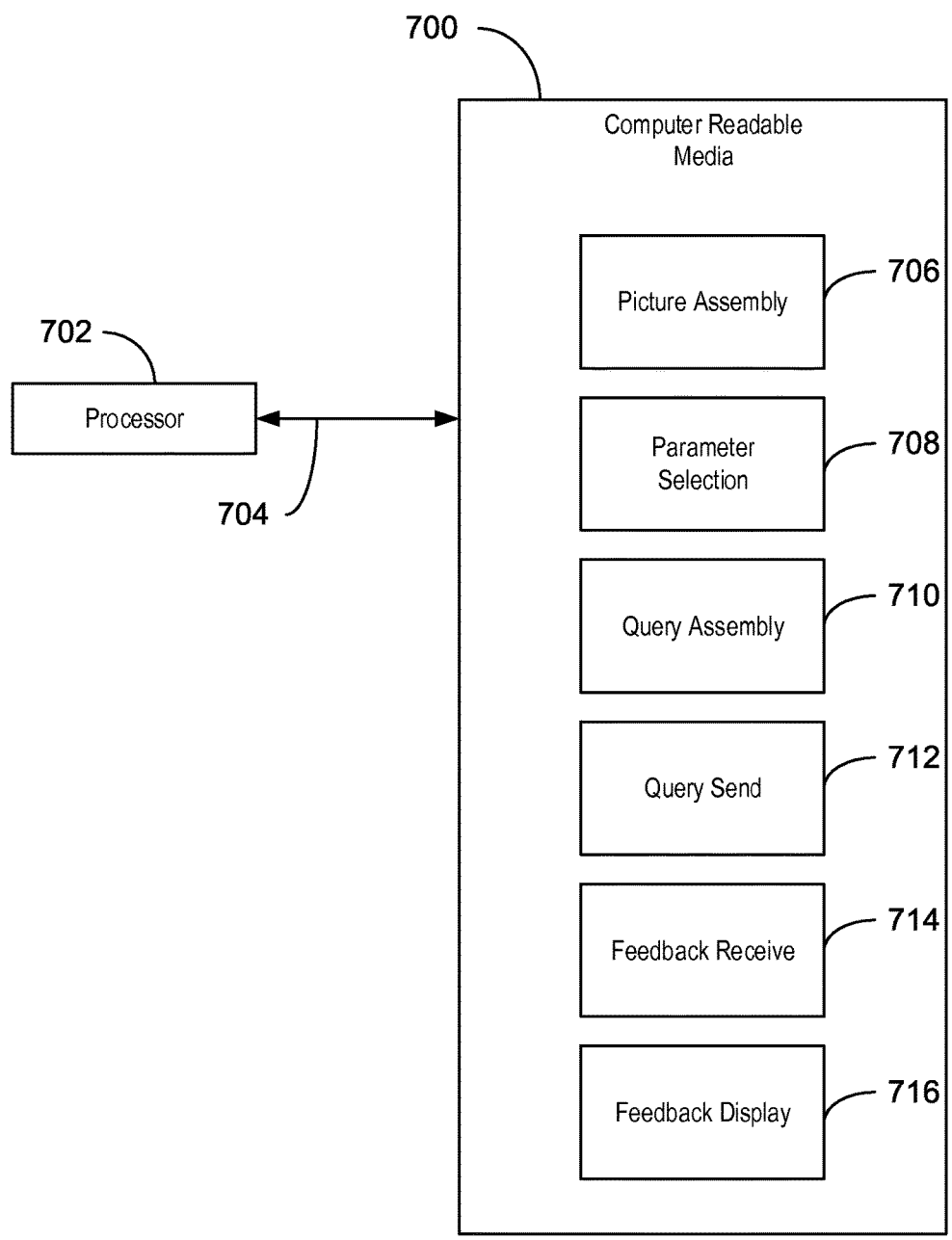
FIG. 7 is a block diagram showing a tangible, computer-readable storage media that can store instructions for obtaining remote shopping advice.

FIG. 7 is a block diagram showing a tangible, computer-readable storage media 700 that can store instructions for obtaining remote shopping advice. The tangible, computer-readable storage media 700 may be accessed by a processor 702 over a computer bus 704. Furthermore, the tangible, computer-readable storage media 700 may include code to direct the processor 702 to perform the steps of the current method 600, as described with respect to FIG. 6.

The tangible, computer-readable storage media 700 can include code 706 configured to direct the processor 702 to assemble two or more media representations onto a single screen to be used in a query. Further, the tangible, computer-readable storage media 700 can include code 708 configured to direct the processor 702 to facilitate selection of feedback parameters by a shopper. For example, the code may instruct the processor 702 to display a screen showing the shopper previous or default selections for the various parameters, giving the shopper the opportunity to change the selections before sending the query. Once the pictures are assembled and the parameters are selected, code 710 in the tangible, computer-readable storage media 700 can instruct the processor 702 to assemble the query. Another block of code 712 can then instruct the processor to send the query on to the reviewers, either through a server system, or individually through a communications network. The query send code 712 may instruct the processor 702 to provide an option to the shopper to proceed, or may assume that the query should be sent as soon as the parameters are selected without further input. Warnings can be provided to the shopper to confirm the send if certain parameters, such as the cost, are higher than previously set limits. The tangible, computer-readable storage media 700 can also include code 714 to instruct the processor 702 to receive feedback from the reviewers. The code 714 may instruct the processor 702 to alert the shopper that the feedback has been received. The tangible, computer-readable storage media 700 can also include code to instruct the processor 702 to display the feedback received.

It is to be understood that any number of additional software components not shown in FIG. 7 may be included within the tangible, computer-readable storage media 700, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLE

A project was implemented to determine the value to shoppers of receiving real time feedback from reviewers and to determine the characteristics of apps and systems that may facilitate obtaining remote shopping advice. The project used a mixed-methods approach to understand current practices and to explore the potential of emerging social platforms, such as online social networks and paid crowd labor markets, to provide remote shopping advice.

Findings from a shopping survey of 200 people, detailing their current and desired remote shopping advice habits is presented first. Next, the results of a field experiment in which people shopping for clothing shared photos of purchase options to (a) a small set of close contacts via MMS (Multimedia Messaging Service, the multimedia version of SMS), (b) their online social network via Facebook, and (c) a set of paid crowd workers on Amazon's Mechanical Turk [mturk.com]. The performance characteristics of these alternatives, including response speed, volume, quality, utility, and influence, as well as participants' comfort level with each experience are reported. From this study, the design guidelines for the technologies to support obtaining remote shopping advice, described herein, were developed.

Shopping Survey

To begin, U.S.-based teenagers and adults, aged 15-60, were surveyed on their experience with, and desired use of, mobile phones to connect with others while shopping. Respondents were recruited via Cint Link, a professional recruiting service which paid participants about $4 per survey completion and 215 responses were received. Fifteen responses were discarded because of poor-quality answers to the free-text recent-critical-incident description question (e.g., typing random character sequences), which left 200 valid surveys that were analyzed.

Most of the respondents fell into three main age groups: 35-54 (57.5%), 18-24 (15.5%) and 25-34 (15.5%). The breakdown of gender was roughly balanced (48% female and 52% male). Additionally, 60% of those surveyed owned a smartphone.

In the survey responses, 45% of the participants reported that they shop in a traditional "brick-and-mortar" store at least once a week, excepting grocery shopping, which was more common. When asked whether they enjoy shopping in these stores, 58.8% responded positively ("slightly enjoy", "moderately enjoy", "strongly enjoy") on a 7 point scale, 14.5% responded negatively ("slightly dislike", "moderately dislike", "strongly dislike") and 26.6% responded neutral. When asked about shopping with a friend, these percentages were very similar (positive—59.3%, negative—17%, neutral—23.6%).

The respondents were asked about the perceived value of receiving feedback from several sources while shopping for clothing. Responses were given on a five-point scale, ranging from 1="not at all valuable" to 5="very valuable." "A specific close contact" was perceived as the feedback source most likely to be valuable (median=4). "A specific small group of your contacts" was considered a neutral value proposition (median=3), and a "topical expert/professional" received a slightly lower-than-neutral rating of 2.5. Receiving feedback from "your entire social network" or from "a group of strangers" were both judged to be not at all likely to be valuable, both receiving a median rating of 1.

Contacting Others while Shopping: Current Practices

The respondents were asked about their experience with contacting others while shopping: "Have you ever been shopping in a store and contacted another person about your shopping activity using your mobile phone?" 54% (107 people) reported engaging in this behavior. Mann-Whitney U tests were conducted to evaluate the statistical significance of reported differences in engaging in this activity among different demographic groups. Women were more likely to have engaged in this behavior than men (63% vs. 45%; z=2.38, p=0.017). Younger people were also more likely to engage in this behavior, e.g., 73% of those under 35 vs. 45% of people 35 and over (z=3.55, p<0.001). Smartphone owners were also more likely to engage in this behavior, e.g., 69% of smartphone owners had done this, vs. 31% of non-smartphone owners (z=5.21, p<0.001).

The 107 people who reported having contacted others while shopping were then asked several follow-on questions, using a recent critical incident approach, in which they were asked to provide a free-text response describing the most recent time they had contacted someone while shopping. They were then asked several follow-up questions about this specific incident. Analyses and percentages in the remainder of this section refer to these 107 respondents.

The most common items involved in the described shopping situations were food (37%), followed by clothing (24%) and electronics (10%). 53% of the situations were cases where the respondent was shopping for an item for himself or herself, whereas 33% were shopping for an item on behalf of the person they contacted. The remainder were shopping on behalf of a third party.

The person contacted was typically a spouse or partner (31%), a close friend (24%), parent (20%), sibling (11%), or child (8%) of the shopper, although 6% responded with other relationships. Typically, the contacted person was not present on the shopping trip because they were busy with other tasks (53%) and 24% were too far away to join in the shopping trip, 15% were not asked to join the shopping experience because the respondent didn't realize they would need their input ahead of time, and 8% didn't accompany the participant for other reasons.

The purpose of the contact was most often to get an opinion about a particular item (in 55% of cases), to inform the other person of an item, sale, or store they might enjoy (32%), or to ask if the person needed anything from the store (19%). In most cases, the shopper needed a response immediately (46%) or within a few minutes (42%). Most received the desired quick replies (70% immediately, 25% within a few minutes).

Phone calls were the most common method of contact (72%), followed by MMS/SMS (47%). Some participants used multiple methods to reach out, e.g., sending a photo and then calling the person to discuss it. 38% of respondents shared a photo as part of this experience, and an additional 10% mentioned that they would have liked to share a photo but were unable to. Video was less popular, with only 14% having used it and another 12% indicating they did not use video, but would have liked to.

Field Experiment

The results of the survey indicated that contacting others while shopping was quite common, particularly the most common scenario of seeking an opinion about an item, often with photographic support. Accordingly, an experiment was designed to explore the potential of emerging social platforms, such as social networking sites and crowd labor markets, to enhance in-store shopping. A goal was to understand the potential of, and differences between, receiving advice from specific friends for specific items, receiving broad advice from groups of friends, and receiving advice from a number of strangers (crowdsourcing). The experiment was conducted at a Seattle-area branch of the U.S. clothing chain Eddie Bauer, which sells casual men's and women's apparel. In order to participate, participants needed to own a smartphone, have a Facebook account, and be willing to share a photo of themselves on both Facebook and Amazon's Mechanical Turk service as part of the study.

Participant Demographics

Participants were recruited from the local community via a recruiting service, and consisted of 14 adults (6 men and 8 women), ranging in age from 20 to 55 years (mean=32), with diverse occupations such as massage therapist, network consultant, lawyer, personal trainer, stay-at-home mother, and information technology project manager. The participants were generally familiar with media and text messaging (MMS/SMS) as a means of communication, with 12 reporting sending basic text messages every day, one sending them a few times a week, and only one indicating they used text messaging rarely (less than once a month). Five participants reported that they typically send photo MMS messages every day, four others said they did so a few times a week, four a few times a month or less often, and one not at all.

All participants reported viewing Facebook to read others' posts at least a few times per week, with 9 doing so every day. All had prior experience posting photos as Facebook status messages. Half of the participants reported doing so at least a few times a week, with the other half doing so more rarely. Four reported never having used their status message to ask a question of their networks, eight did so only rarely (less than once a month), and two did so often (a few times a week or every day). 10 participants (71%) were familiar with the concept of paid crowdsourcing prior to their experience in the experiment, though none had used such a service.

Figure 8:
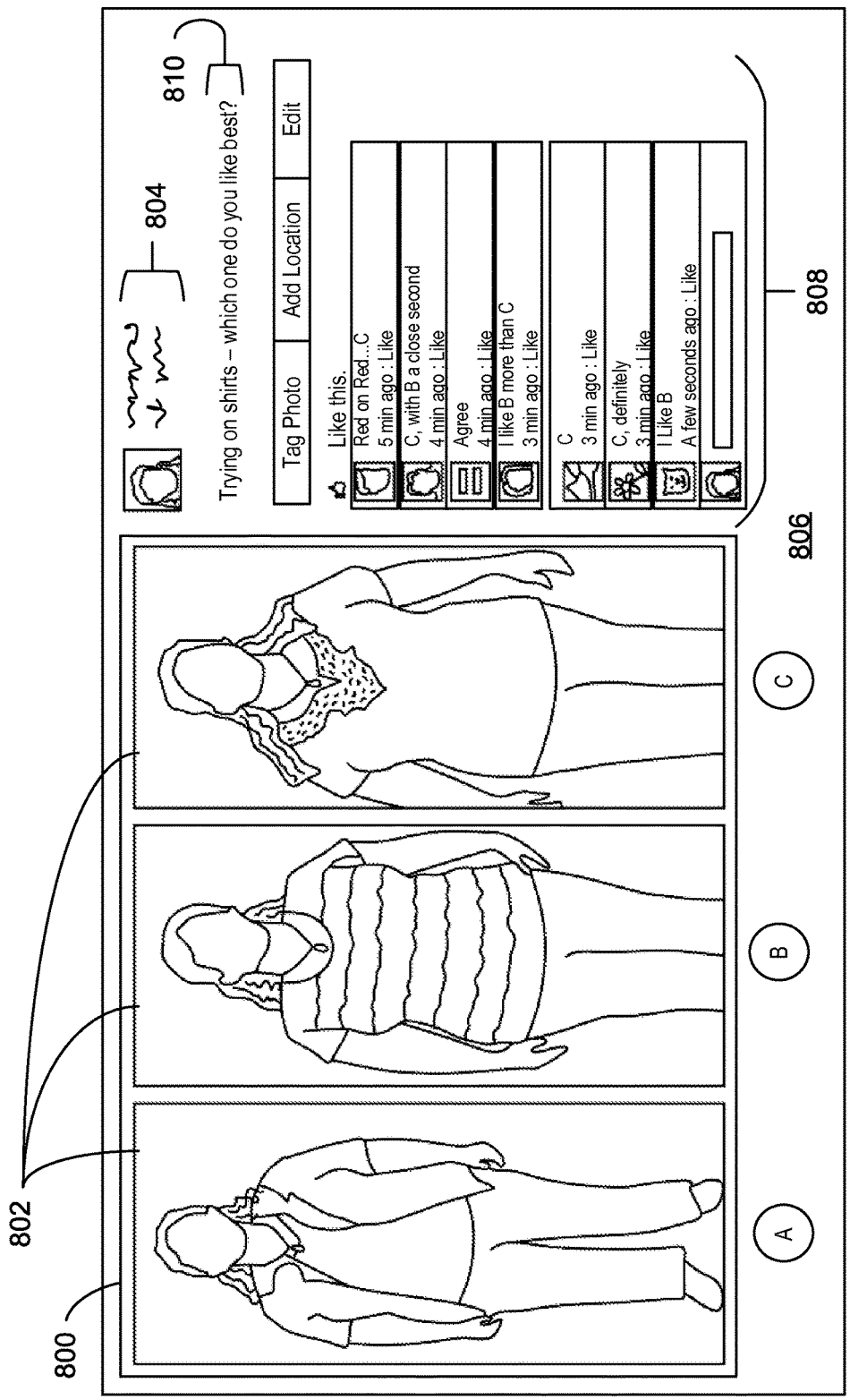
FIG. 8 is a drawing of a composite image that was manually generated from three pictures to show the shopper's shopping choices.

FIG. 8 is a drawing of a composite image 800 that was manually generated from three pictures 802 to show the shopper's shopping choices. The pictures 802 were labeled "A", "B", and "C" to allow easy reference and voting by recipients. In this example, a participant is considering which of three shirts to purchase. The facial features were blurred for privacy, but were not blurred during the study itself. This screenshot shows a participant's 804 Facebook post 806 and the responses 808 received. The participant added a caption 810 to the photo: "Trying on shirts—which one do you think is the best?" and received opinions from seven friends within 10 minutes, with a delay of five minutes before receiving the first response. In this instance, the majority (five friends) indicate a preference for item C. Note how the third reviewer's response builds on that of the second reviewer: "Agree with <name>."

Methodology

When a participant arrived at the store, they were given 10 minutes to browse for merchandise to find three items they would be interested in trying on. Participants then tried on each article in a private dressing area. After trying on the first item, the participants were instructed to use their own smartphone to take a photo of themselves modeling the item of clothing, in order to understand potential usability difficulties in having solo shoppers capture this type of data. One of the experimenters then used her own phone to capture an image of the participant, and also took photos of the participant modeling the subsequent two items. The experimenter than created a single composite image of the three fashion choices using the PhotoGrid app [photogrid.org], which she then manually modified to add the labels "A", "B", and C" below the three respective components of the composite image 802. The experimenter then emailed this composite image to the participant 804, who downloaded it onto his or her phone.

The participant next sent the composite image along with a message to one or more people by MMS, and posted the image and a (possibly different) message on their Facebook Wall (visible to all friends). Meanwhile, the experimenter posted a survey to Mechanical Turk, in a human intelligence task (HIT) that paid U.S.-based workers 25 cents to answer a four question poll giving fashion advice. The HIT had a lifespan of 10 minutes and was set to accept a maximum of 20 workers. Workers completing the HIT were redirected to a survey on surveygizmo.com showing them the composite image and asking them to recommend either A, B, or C, in response to the question "Which outfit should this [man/woman] buy?", where the term "outfit" was sometimes substituted with more specific items such as "shirt" or "sunglasses" depending on what the participant chose to try on). The workers were also asked to enter a brief (single-sentence) explanation explaining their recommendation, specify their gender, and specify their age bracket.

Meanwhile, the participant filled out a questionnaire similar to the survey about using a mobile phone while shopping described earlier in this paper. The survey was augmented with additional questions about which of the three items the participant preferred, their level of confidence in their choice, and the expected value of feedback from MMS, Facebook, and Mechanical Turk platforms. The survey took approximately 10 minutes to complete, although if fewer than 10 minutes had passed, the experimenter engaged the participant in conversation to allow each medium to have 10 minutes to gather responses. The period of 10 minutes was chosen based on the initial survey, which found that 88% of people need responses to their shopping questions either "immediately" or "within a few minutes."

From this response, it was inferred that responses beyond a 10 minute window would therefore be of less value in many common shopping scenarios.

The participant next reviewed the responses from the three sources, by checking their phone for any MMS replies, checking their Facebook account for any comments on their post, and viewing a report generated via the Survey Gizmo service. The report displayed all the results from the Mechanical Turk survey, including breakdowns of the favorite item among different ages and genders of workers, and the comments supporting those choices. The number of responses from each source and the time (in minutes) to receive the first response (if any was received) were recorded. Only one comment per person was counted, thus, if a person sent multiple SMS replies, or made multiple Facebook posts, that only counted as a single response. Further, Facebook "likes" were not counted as responses.

The participant then completed a final questionnaire, which asked them again to choose their favorite item, and rate the value and influence of the feedback from the three sources. The participant was also asked to identify positive and negative aspects of their experiences with each of the sources. The entire experimental session lasted about 45 minutes. Participants were not obligated to purchase any of the items (though four chose to do so).

Self-Portrait

Participants used two strategies to obtain the self-portrait. 10 participants used the dressing room's mirrors to take a photo of themselves, and 4 held the phone out in front of themselves to snap a portrait. This latter method was used primarily to capture headshot-only portraits, e.g., for two men trying on sunglasses and one woman trying on hats, or head-and-torso, e.g., for one man trying on T-shirts.

Figure 9A:
FIGS. 9A and 9B are drawings of common problems that occurred during the self-portraits.
Figure 9B:

FIGS. 9A and 9B are drawings of common problems that occurred during the self-portraits. These problems included flash reflections in mirror, as shown in FIG. 9A, and eyes gazing at phone rather than directly ahead with the phone partially obscuring the face, as shown in FIG. 9B.

Results

Figure 10:
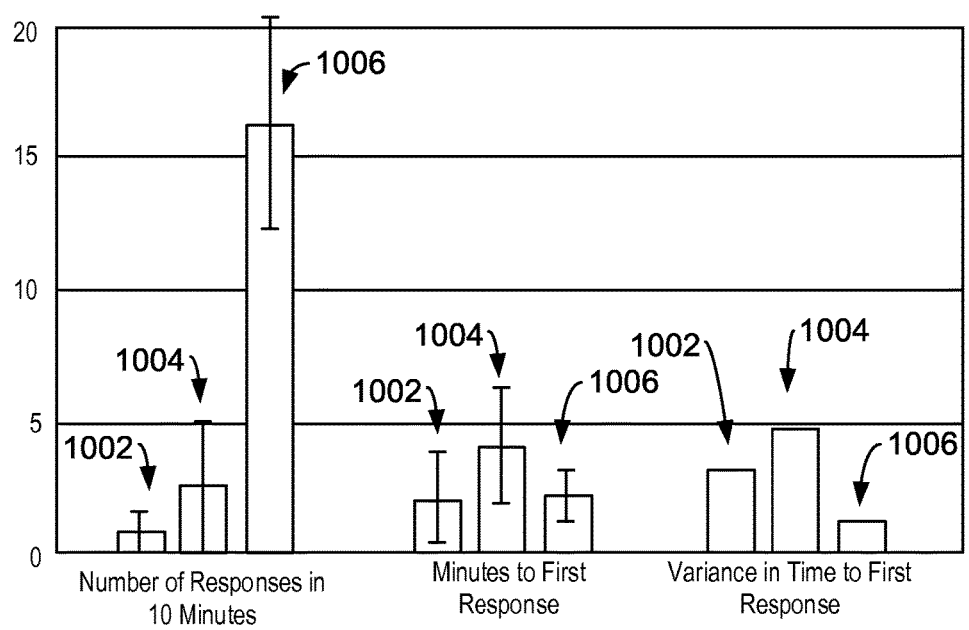
FIG. 10 is a bar chart showing the time to response for each of three test messages, from MMS response, Facebook response, and Mechanical Turk responses.

FIG. 10 is a bar chart 1000 showing the time to response for each of three test messages, from MMS 1002, Facebook 1004, and Mechanical Turk 1006. This was used to indicate the relative performance of the three social feedback mechanisms used in the field experiment. The error bars reflect standard deviation. The crowdsourcing via the Mechanical Turk 1006 site quickly and consistently provided the most responses. MMS 1002 performed more quickly than Facebook 1004 on average, but was less consistent in producing a response. Time to first response reflects only those participants who received responses in a given medium.

A one-way repeated measures ANOVA found a significant difference in the number of responses received from each source ($F_{2,12}=99.9$, $p<0.001$); follow-up pairwise comparisons between each feedback source were all significant ($p \leq 0.01$) with Mechanical Turk 1006 receiving the most responses (a mean of 16.4), followed by Facebook 1004 (2.6), and MMS 1002 (0.8).

MMS

Seven participants sent an MMS 1002 message to exactly one person, with the rest sending to between two and six recipients. Recipients were described as close friends (7), spouses/partners (5), parents (4), siblings (4), and other relatives (2). The number of recipients was negatively correlated with time to receive an MMS reply ($r=-0.2$), and the total number of replies was positively correlated with the number of recipients ($r=0.5$).

Five of the 14 participants (36%) did not receive a reply to their text message within 10 minutes. For those who did receive MMS 1002 replies, the mean time to first response was two minutes. The average number of MMS 1002 responses received was 0.8, rising to 1.2 when only considering people who received at least one response. However, nobody received MMS 1002 responses from more than two people.

Facebook

Three participants (21%) did not receive any Facebook 1004 replies within 10 minutes while another 2 participants received Facebook 1004 responses that did not offer guidance on the shopping task. These responses either sought clarification or were humorous, e.g., "no swimwear option?" and "where are you going?".

An average of 2.6 Facebook 1004 responses were received (3.3 among those who received at least one answer, min=1, max=8), with an average of 4 minutes to receive the first response. FIG. 8 depicts an example of a Facebook 1004 post and the responses obtained during the experiment.

Participants had between 179 and 1559 Facebook 1004 friends (median 340, mean 512). As expected, larger network sizes increased Facebook's responsiveness, with the number of responses positively correlated with network size (r=0.2) and time to first response negatively correlated (r=−0.6). Factors beyond network size may also have had an impact, such as time of day. For example, one participant had immigrated to the United States from India a few years prior and noted that over half of his Facebook friends still lived in India. Due to time zone differences, those friends were likely asleep and therefore not available to see his post (he received no replies). Facebook 1004 use habits also impacted performance, with participants' self-reported frequency of posting a status update correlating positively with the number of responses received (r=0.4) and negatively with time to first response (r=−0.5).

Crowdsourcing

All participants received feedback from Mechanical Turk 1006 within the allotted time period. An average of 16.4 Mechanical Turk 1006 workers provided feedback within 10 minutes (min=8, max=21), with an average of 2.1 minutes to the first completed response. The four-item survey took between one and two minutes to complete).

Comparisons

The time to receive the first response was not significantly different across feedback sources when considering only those cases where feedback was received from all three sources, $F(2,5)=1.28$, $p=0.36$. However, using 11 minutes as a generous estimate of the time to first response for people who did not receive a response from a given medium within 10 minutes, a one-way repeated measures ANOVA found a significant difference in the time to first response: $F(2, 12)=5.34$, $p=0.02$. Follow-up pairwise comparisons between time to first response for each feedback source showed no significant difference in response time between MMS 1002 and Facebook 1004 ($p=0.84$), but a significant speed advantage for Mechanical Turk 1006 as compared to MMS 1002 ($p=0.037$) and Facebook 1004 ($p=0.008$). Furthermore, the speed of response from Mechanical Turk 1006 was more consistent, having the least variance in time to first response (1.0), followed by MMS 1002 (3.0) and then Facebook 1004 (4.6).

Response Quality

MMS 1002 replies tended to be quite short, which is understandable, due to the character limits imposed on MMS 1002 messages, the difficulty of typing on smartphones, and the social conventions surrounding texting. Examples of typical, brief MMS replies included: "B"; "C"; "The watch."; "The first one." Only two participants received detailed replies via MMS: "C seems to stand out, A, too, and I could see you choose B (I know, no help)"; "Yes, black suits you. And I like the first one also. A or C. A seems very summery." The average length of MMS responses was 27.9 characters.

Facebook 1006 responses included a roughly equal mix of very brief (e.g., "A," "I like B," "C, definitely"), and those elaborating on the reasoning behind the choice (" . . . I always love more color . . . C is my choice"; "I like either A or B because they would work better through all the seasons."; "C! Lights up your face!"). Responses were generally positive, though three male participants and one female each received a response that employed sarcastic humor ("That hat is freaking terrible. Burn it."; "I would kiss the guy in A"; "No swimwear option?"). Facebook responses averaged 23.4 characters.

All of the crowd-workers, e.g., on Mechanical Turk 1006, were required to complete a free-response question that asked them to "explain the reasoning behind your recommendation." Crowdsourced responses averaged 63.1 characters.

A repeated-measures ANOVA indicates a significant difference in response length: $F(2,5)=25.7$, $p=0.002$; follow-up pairwise comparisons indicate no significant difference in length of response from MMS 1002 and Facebook 1004 ($p=0.61$), but the crowdsourced responses were significantly longer than either MMS 1002 responses ($p=0.037$) or Facebook 1004 responses ($p=0.001$). Longer length has been found to be a positive indicator of answer quality in other social media, such as online Q&A forums.

We counted the number of generic, low-quality responses from Mechanical Turk 1006, e.g., responses that simply stated that one choice looked best, without offering any specific rationale, such as "looks best" or "It's the most pretty". The proportion of such responses ranged from 0% to 26%, averaging 10.6% of all responses. The overwhelming majority of crowd workers offered specific tidbits of thoughtful advice, such as: "I think the floral pattern is very pretty and adds a bit of flair"; "It's sophisticated but casual, and fits her the best"; "I like that it is plain but a good fit."; "It's simple and clean and well [sic] work for any occasion [sic]."; "The colors go good with her hair."

Unlike MMS 1008 and Facebook 1004 feedback, which only offered positive comments, the responses from the crowd workers also gave feedback about which items were not flattering, and why. For example, "The green shirt does not look good at all, doesn't go well with her face and eyes . . . "; "The white V-neck is kinda cheesy with the flower print"; " . . . A makes his arms look super short"; "the other colors are boring"; "It is more for his age." Many participants valued this honesty.

Participants found the ability to see breakdowns of crowd workers' votes by age and gender "very cool . . . very interesting". For example, one male participant found it revealing that men's votes were distributed equally across the three shirts, whereas none of the women liked the shirt that was less tight-fitting, and people aged 35 and over preferred a more conservative, collared shirt, whereas younger people preferred the other options.

For the 11 participants who received responses expressing a fashion preference from at least one of the personalized social sources (MMS 1002 or Facebook 1004), in 9 cases (82%) the majority choice of the Mechanical Turk 1006 workers agreed with the majority choice from at least one of the personal social sources. In the 7 cases where all three sources returned an opinion, the MMS 1002 and Facebook 1004 majority opinion matched for 4 (57%) of the cases, and the Mechanical Turk 1006 opinion agreed in all four of these cases. The majority recommendation of the Mechanical Turk 1006 workers was the only one to be significantly correlated with participants' own final item preference (Pearson's R=0.53, p=0.05).

Impact on Participants' Choice

Recommendations Match Participant's Initial Choice

For five participants, their initial favorite item matched the recommendations from at least one of the feedback sources and they maintained this choice after receiving all of the feedback. Two participants, however, did not align with the majority feedback. One of these commented that "I usually end up going with my own opinion" and another emphasized her personal preference, "I like the wider spacing on the stripes." In all cases, these participants were initially very confident with their choice (4 or 5 ratings on a five-point scale) and their confidence either stayed the same, or increased.

One participant changed her initial choice, when the recommended feedback from all three sources matched her initial choice. When asked what she was looking for from the feedback sources she commented, "I wouldn't take anyone's feedback." Initially, she was very confident in her choice (5 rating) but after she changed her choice (against the recommendations) her confidence in her new choice was low (2 rating).

Recommendations do not Match Participant's Initial Choice

For four participants, their favorite items did not match the recommendations from the feedback sources, but they maintained their initial choices. Their comments indicated that they primarily stayed with their choice because of personal preference, but they did consider the recommendations ("I still like the white, but the comment that it looks like a undershirt may have some merit. Most women say that A looks better, so I would strongly consider A if B was not available", "the age group/gender that I would be most interested in looking attractive to seemed drawn to B or C, and personal preference combined with the crowdsourcing feedback convinced me to choose B"). Two participants were very confident in their initial choice (ratings of 4 or 5), but after getting feedback one's confidence went down. Two other participants were not confident both before and after the feedback (ratings of 1 or 2) and one commented that she didn't like any of the items.

For four participants, their initial favorite item was not recommended by any of the feedback sources, and all these participants subsequently changed their choice to match the majority recommendations received. In all four cases, their new choice matched the crowd workers' modal recommendation. Three of the four participants were initially very confident with their choices (4 or 5 ratings) but one was not confident with her choice (1 rating). After the feedback, all of these four participants were very comfortable with their new choice (4 or 5 ratings). Three of the participants explicitly commented that the crowdsourced feedback caused them to change their rating ("The crowdsource [sic] & MMS responses were different than what I picked and I will go with what looks best to everyone", and "The watch seemed to get a lot of good feedback that was well reasoned via crowdsourcing. I find that surprisingly compelling").

When asked what kind of feedback would be most valuable in helping them decide among the items, eight participants mentioned feedback about whether the items looked good or not ("opinions of whether they look good or not, fashionable, etc.", "what looks best") and four participants mentioned feedback from a friend, boyfriend, or girlfriend ("would want one of my girlfriends to give me a yay or nay").

Usefulness of the Different Feedback Sources

Figure 11:
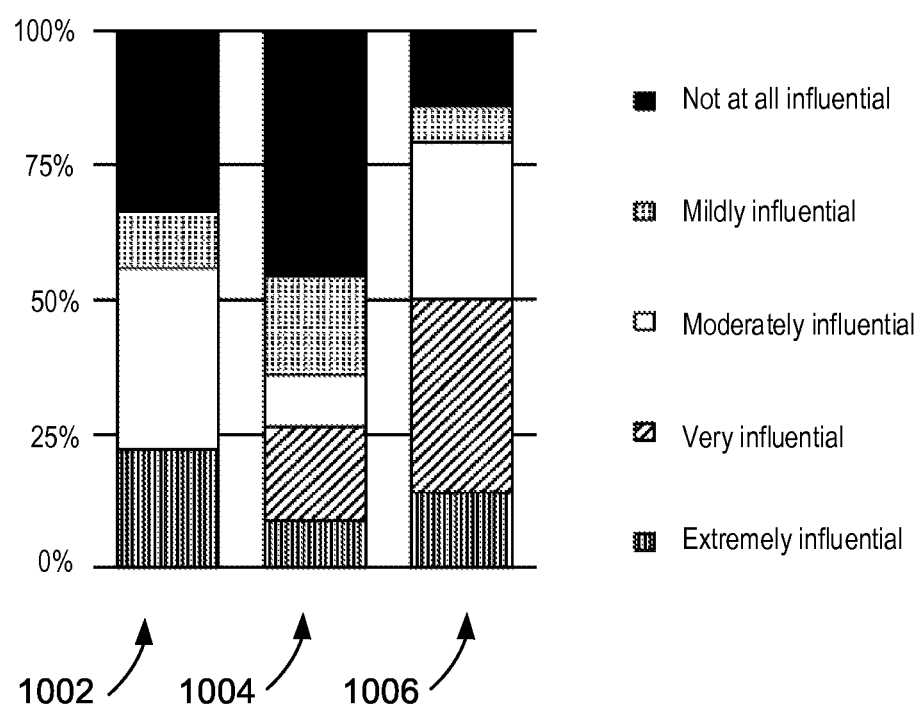
FIG. 11 is a bar chart showing the influence of responses to a query based on a demographic parameter of the reviewer.

FIG. 11 is a bar chart 1100 showing the influence of responses to a query based on a demographic parameter of the reviewer. Like numbered items are as described with respect to FIG. 10. Participants reported that the feedback crowdsourced from strangers, e.g., by Mechanical Turk 1006, was influential.

After receiving their feedback, participants ranked how influential the feedback from each source was in determining their preferred choice on a five-point scale from "not at all influential" to "extremely influential". The results are shown in FIG. 11. The participants rated the feedback from the crowdsourcing platform, Mechanical Turk 1006 (median=3.5) as more influential than both MMS 1002 (3) and Facebook 1004 (2), though this trend is not a statistically significant difference according to the results of a Friedman test, $\chi2(2, N=7)=3.7$, p=0.156. It can be noted that the test excluded cases where participants did not receive feedback from all three sources.

Before receiving feedback, the participants rated how useful they felt each source would be on a five-point scale from "not at all useful" to "extremely useful". After receiving feedback they rated the actual usefulness of each source from which they received feedback. For MMS 1002, the median rating was 3 ("moderately influential") at both the start and end of the study. A Wilcoxon test indicates that there was no significant difference in participants' opinions of the expected utility of MMS 1002 feedback at the beginning of the study with their opinions of its actual utility at the end of the study, z=1.5, p=1.0. A similar trend was found for Facebook 1004, which also had a median rating of 3 in both instances, z=−1.12, p=0.27. Note that these median ratings likely reflect an overestimate of the perceived utility of MMS 1002 and Facebook 1004, as only participants who actually received feedback from these sources rated them. The participants who received no feedback at all presumably received a much lower utility from such sources. However, the results for the crowdsourced condition, e.g., Mechanical Turk 1006, were significantly different, with the median rating for the perceived utility rising from 3 ("moderately useful") before the experience to 4 ("very useful") after having received feedback, z=2.49, p=0.013.

Discussion

The initial survey revealed that many people engage in remote shopping advice experiences via mobile phones, typically via traditional voice-based phone calls, though occasionally employing multi-media including text, photos, and video. These experiences always involved known contacts (friends and family), and survey respondents did not think that social shopping feedback from strangers would be valuable, except, perhaps, for topical experts. However, when exposed to rich, multimedia remote shopping advice experiences in the field experiment (posting photos via MMS, Facebook, and Mechanical Turk), participants reacted favorably, finding feedback from all sources useful and influential. Participants were often surprised by the usefulness of feedback from strangers; their attitudes about this novel social experience changed significantly during the course of the session.

Friends Vs. Strangers

The main strengths of receiving feedback from crowds of strangers, rather than from friends (via MMS or Facebook), included independent judgments, honesty, and speed and consistency. The crowd workers did not see others' votes on Mechanical Turk, and were not influenced by them. This is considered a prerequisite to effectively harnessing the "wisdom of crowds". In contrast, the Facebook reviewers were sometimes perceived as amplifying the opinions of those who replied earliest. In some cases this echo-chamber effect was explicit, e.g., one response in FIG. 8, which simply states "Agree with [name of prior commenter]".

Further, while personal contacts told shoppers what items they recommended, the crowd workers also told shoppers what items they did not recommend, and their reasons for that. Most shoppers found these critical opinions refreshing, though a few were insulted, e.g., one woman's size was referred to in a blunt manner. It can be noted that the lack of personal ties between the crowdsource workers and the shoppers provided the benefit of novel information (critical and negative feedback) not offered by either their strong or weak personal ties.

Personal contacts (via MMS and Facebook) and strangers (via Mechanical Turk) both responded within a few minutes of receiving the shopper's inquiry. The initial survey study found that feedback within a few minutes would be satisfactory to most people seeking remote shopping advice, suggesting that this level of latency is acceptable for creating a working system. However, the crowd workers' response latency, and likelihood, was much more consistent than personal contacts, who were not always immediately available.

The main drawbacks of using crowds rather than personal contacts included context, and cost. As found in prior studies of asking questions in social networks, shoppers appreciate that their personal contacts are often aware of relevant context, such as a shopper's personal style. Other contextual elements, such as the price of the items being considered, might be worth providing to the reviewers, regardless of whether they are personal contacts or strangers.

Further, in this experiment, the cost of crowdsourcing was absorbed by the project. However, this would likely be paid by end reviewers in a deployed system. Other mechanisms could be used to facilitate fast replies, but the cost of crowd opinions is still likely to be higher than the free price of responses from personal contacts. However, responses from personal contacts come with a social cost. For frequent inquiries, many shoppers may prefer a financial cost rather than a social one. Discovering how much participants are willing to pay for such a service in practice is an open question. It may be that participants' enthusiasm for the service would wane if they bore the cost of crowdsourcing.

Privacy did not appear to be a drawback of crowdsourcing, though participants did express concern about sharing images of themselves to their personal networks on Facebook. This is perhaps an artifact of the type of participant willing to volunteer for our study. It is possible that people who would have had concerns about sharing personal images on Mechanical Turk chose not to participate. Blurring or other techniques could be used to mitigate potential privacy issues on Mechanical Turk, although facial features, skin tone, hair, etc. were a factor that influenced many crowd workers' choices, as revealed through their comments, e.g., "doesn't go well with her face and eyes"; "The jacket matches well with her skin complexion and hair". Assessing the risks, benefits, and tradeoffs involved in sharing various types of information with members of the crowd is an area for additional research. The use of mechanisms to restrict sharing to a subset of one's social network may mitigate shoppers' concerns regarding sharing in a public medium.

Towards Remote Shopping Advice Systems

The survey findings indicate that seeking input from remote people while shopping is a relatively commonplace occurrence, but that most people currently obtain feedback with simple voice or text-based interactions. The experiment demonstrated that shoppers found value in using richer media (photos) as well as using emerging social platforms (social networking sites and crowd labor markets) to meet these needs, and that such platforms' performance characteristics (particularly Mechanical Turk) were generally suitable for such interactions.

Based on these findings, it is expected that consumers would find value in a smartphone app designed specifically to support seeking remote shopping advice. The results suggest that key capabilities of, and challenges that should be overcome by, such an app would include image capture, audience targeting, and decision support.

Facilitating a shopper's ability to capture an image, particularly for clothing, which requires self-portraits, is a challenge. One approach, such as that used by the app "Headshot" [aka.ms/headshot] is to provide visual feedback to help the shopper better position the camera. Using video and perhaps letting crowd workers choose the best frame for inclusion in an image may be an alternate approach. Crowd labor or automatic techniques could also be used to automate the manual image compositing/labeling performed for the study, although this could be costly. We recommend using a single, composite image, due to shoppers' reluctance to bombard their social networks with too many posts. Beyond technical issues, capturing such images or video may be challenging due to evolving societal norms about the use of such technologies. For example, other patrons in dressing rooms may have privacy concerns about being inadvertently included, or shop owners may assume patrons are recording images of merchandise as a reminder to later seek better deals in online shops.

Providing the ability for shoppers to target their query to one or more audience types would enable shoppers to harness the consistent speed and "blunt" responses from sources like Mechanical Turk and the personalized and trusted responses from friends and family. Such a system could show shoppers predictions of the likely response time from each source, based on factors like the price they are willing to pay for crowd labor, the time of day, and the size of their online social networks. Of course, shoppers' choices of which platforms to employ might be influenced by characteristics beyond answer speed and type. For example, privacy preferences, and/or differential preferences for the "informational" versus "social" aspects of the remote shopping advice experience may also influence their selection of medium. Shoppers choosing to engage crowd laborers could potentially specify worker characteristics that were relevant to their task, such as age, gender, geographic region, expertise with certain types of products, personal taste profiles, costs, etc.

Finally, a remote shopping advice application could provide interactive support, perhaps through information visualization techniques, to allow shoppers to explore, compare, and contrast feedback from different audiences. It was noted that participants in the study found the differences and similarities between personal contacts' and strangers' recommendations informative, as well as differences between sub-audiences, such as male versus female workers. Such an interface might also allow shoppers to factor in other sources of information, such as online reviews and pricing.

What is claimed is:

1. A method for obtaining remote shopping advice, comprising:

taking, via a camera, two or more pictures of items, within a social shopping app on a first device comprising a processor;

receiving, via the processor, a parameter from the social shopping app;

assembling, via the processor, the two or more pictures into a query within the social shopping app based, at least in part, on the parameter;

sending, via the processor, the query to a remotely located second device via the social shopping app based on the parameter;

generating, via the processor, a prediction of a response time from the remotely located second device based on a time of day and a size of an online social network; and modifying, via the processor an information visualization of the social shopping app to include the prediction of the response time from the remotely located second device.

2. The method of claim 1, wherein taking the two or more pictures is performed on a mobile device.

3. The method of claim 1, wherein taking the two or more pictures comprises adjusting each picture to show a similar view of the items.

4. The method of claim 1, wherein the parameter comprises a demographic characteristic of a reviewer.

5. The method of claim 4, wherein the parameter comprises an age range for the reviewer.

6. The method of claim 4, wherein the parameter comprises a gender for the reviewer.

7. The method of claim 1, wherein the parameter comprises a cost for feedback.

8. The method of claim 1, wherein the parameter comprises a preselected list of people for the query.

9. The method of claim 1, wherein assembling the two or more pictures into a query comprises building a message in which all of the two or more pictures are shown proximate to each other to facilitate a response.

10. The method of claim 1, wherein sending the query to a reviewer comprises: sending the query to a social shopping server which forwards the query to a plurality of reviewers based, at least in part, on the parameter.

11. The method of claim 10, wherein the query is sent directly to a mobile device of a reviewer.

12. The method of claim 1, comprising displaying text messages proximate to the two or more pictures.

13. The method of claim 1, comprising displaying an indicator next to one of the two or more pictures to indicate a preference from a plurality of reviewers.

14. One or more computer-readable storage media for obtaining feedback comprising a plurality of instructions that, when executed by a processor, cause the processor to:

take, via a camera, two or more pictures of items, within a social shopping app on a first device comprising the processor;

assemble the two or more pictures onto a single screen;

present a parameter for a reviewer for selection by a shopper;

assemble the single view into a query based, at least in part, on the parameter;

send the query to a remotely located second device via the social shopping app based on the parameter;

generate a prediction of a response time from the remotely located second device based on a time of day and a size of an online social network; and modify an information visualization of the social shopping app to include the prediction of the response time from the remotely located second device.

15. The one or more computer-readable storage media of claim 14, wherein the instructions cause the processor to pay for a review.

16. The one or more computer-readable storage media of claim 14, wherein the instructions cause the processor to display feedback from a plurality of reviewers proximate to one of the two or more pictures.

17. A system for obtaining remote shopping advice comprising:

a processor to execute processor executable code;

a communications device;

a display device; and a storage device that stores processor executable code, wherein the processor executable code, when executed by the processor, causes the processor to:

take, via a camera, two or more pictures of items within a social shopping app on a first device comprising the processor;

assemble the two or more pictures into a single view on the display device;

receive a parameter from the social shopping app;

assemble the single view into a query based, at least in part, on the parameter;

send the query to a remotely located second device over the communications device based on the parameter;

generate a prediction of a response time from the remotely located second device based on a time of day and a size of an online social network; and modify an information visualization of the social shopping app to include the prediction of the response time from the remotely located second device.

18. The system of claim 17, wherein the processor executable code, when executed by the processor, causes the processor to:

send the query to a server; and request the server forward the query to a plurality of reviewers based, at least in part, on the parameter.

19. The system of claim 17, wherein the communications device comprises a wireless wide area network (WWAN) radio.

20. The system of claim 17, wherein the communications device comprises a wireless local area network (WLAN) radio.

* * * * *